United States Patent [19]
Murray

[11] Patent Number: 5,820,093
[45] Date of Patent: Oct. 13, 1998

[54] UNIVERSAL UTILITY MOUNT FOR MOVING VEHICLE

[76] Inventor: Stephen C. Murray, 1130 San Dieguito Dr., Encinitas, Calif. 92024

[21] Appl. No.: 786,782

[22] Filed: Jan. 21, 1997

[51] Int. Cl.$^6$ ..................................................... E04G 3/00
[52] U.S. Cl. ........................................ 248/274.1; 396/419
[58] Field of Search ............................... 248/200, 274.1, 248/276.1, 278.1, 284.1, 285.1, 286.1, 475.1, 476; 396/419, 428

[56] References Cited

U.S. PATENT DOCUMENTS

| | | | |
|---|---|---|---|
| 2,898,065 | 5/1959 | Ackley | 248/278.1 |
| 3,259,349 | 7/1966 | Lee | 248/274.1 |
| 4,120,476 | 10/1978 | Bourassa et al. | 248/486 |
| 5,039,050 | 8/1991 | Eidschun et al. | 248/279 |

Primary Examiner—Leslie A. Braun
Assistant Examiner—Robert Lipcsik
Attorney, Agent, or Firm—John J. Murphey, Esq.; Murphey Law Offices

[57] ABSTRACT

A universal utility mount for attaching an object exterior of a vehicle including at least three pad mounts in spaced-apart arrangement for attachment to the exterior surface of the vehicle, a transition fitting attached to each pad mount, each fitting allowing adjustment through 360° in azimuth and through 95° from zenith, at least three thin-walled support tubes of terminal length, each tube containing a straight portion intermediate the terminal ends thereof, the tubes extending outward from the transition fittings, a bracket attached to the support tubes on which to mount the object, and a device for providing light-weight stiffening to the support tubes in the area of attachment with the object-mounting bracket.

23 Claims, 5 Drawing Sheets

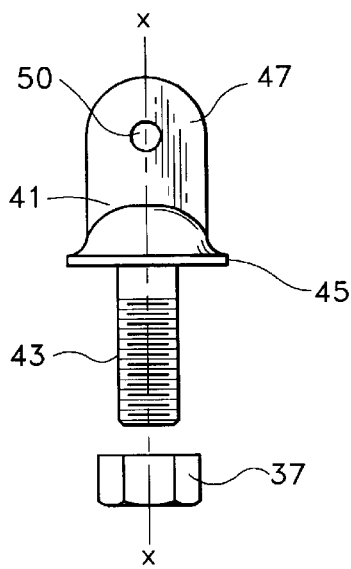
Fig. 7
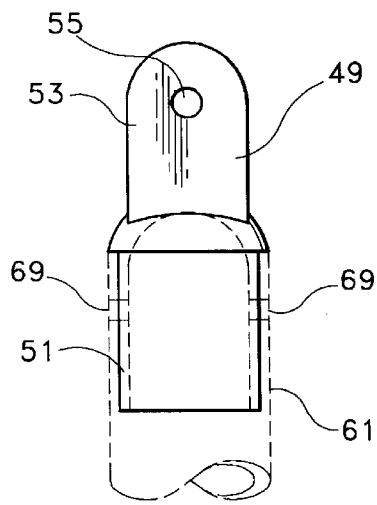
Fig. 9
Fig. 11
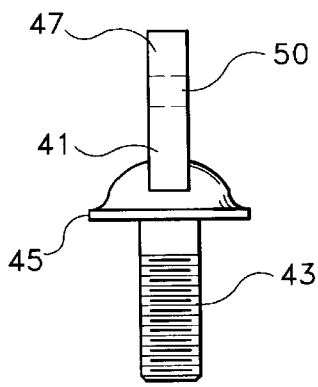
Fig. 8
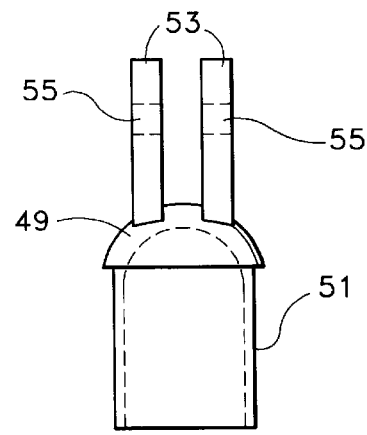
Fig. 10
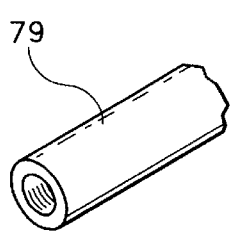
Fig. 12a
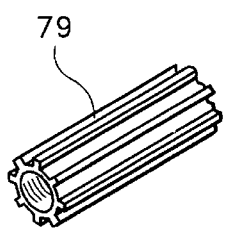
Fig. 12b
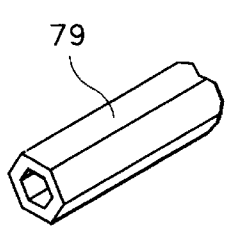
Fig. 12c
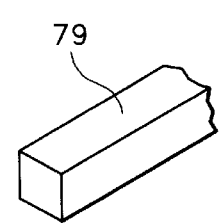
Fig. 12d

UNIVERSAL UTILITY MOUNT FOR MOVING VEHICLE

BACKGROUND OF THE INVENTION

1. Field of the Invention

This invention pertains to the field of structures for mounting one object relative to another. More particularly, this invention pertains to the field of structures for rigidly supporting an object, such as a forward looking infrared (FLIR) device, external to a moving vehicle, such as a helicopter, that is universal in application to a wide range of objects.

2. Description of the Prior Art

Supporting one device on a structure or other device is almost as old as time itself. Certainly, the cave-woman wife asked her cave-man husband to build a rack on which to place food, drink or other consumables out of the reach of the competition, whether that be carnivores or the neighbors. Over time, these structures have become part of everyday life and have taken on designs as different as one person's thoughts are from another.

Probably beginning with the shipping industry, and continuing at a seemingly ever-increasing rate to the present time, objects have been mounted in one fashion or another on moving vehicles. Cannons were supported on the hull of boats for ease in maneuvering, aiming and firing harpoons at whales; search lights were mounted on trucks and cars to assist one in looking for game and searching for other people; and, television cameras are mounted on aircraft to allow their use in reporting daily events and catching speeders.

For some uses of mounting brackets, the main object is to support the weight of the object on the vehicle. When dealing with ships, cars and trucks, the bracket needs to be strong along the vertical axis, in order to support the weight of the object and little attention is paid to other forces that may, but usually do not, come into play. However, when an object is to be mounted on a flying vehicle other factors need to be considered, such as the effect on the bracket when the vehicle is rotated about its central axes during climbing, diving, pitching and yawing. These movements create forces on the object that require special attention so that the object is not moved from its original spatial relationship with the vehicle and provide inaccurate information to the vehicle pilot.

On top of these extra problems, there is the ever-present matter of cost of fabrication and installation. The whole field of support brackets is basically that of individual design. What works for one designer is usually not copied by another designer, either because of the lack of sturdiness, weight factors, or merely because of the personal choice. Regardless of the reason, the fact remains that brackets for mounting an object exterior an aircraft are singular in concept, expensive to fabricate, and have little translation from one situation to another.

SUMMARY OF THE INVENTION

This invention is a universal mounting for objects exterior of vehicles having maximum strength and minimum weight. While it is described here as being used on a helicopter, it finds wide use in a variety of situations. It is light-weight, due to the use of thin-walled tubing; it is easy to attach to the vehicle; it is universal in positioning in that the support tubes may be moved through 360° in azimuth and 95° in zenith; and it is rigid due to the use of stiffening only at places of potential weakness.

The invention comprises at least three pad mounts for spaced-apart attachment to the exterior surface of the aircraft or vehicle, a transition fitting attached to each pad mount that allows the aforesaid azimuth and zenith positioning, a plurality of thin-walled support tubes of terminal length extending outward from the transition fittings, where the tubes each include a straight section intermediate their respective terminal ends, and where none of the straight portions lie in a plane, a bracket attached to the support tubes on which to mount the object, and means for providing lightweight stiffening to the support tubes in the area of attachment to the object-mounting bracket.

It has been found that each aircraft varies slightly in size and the rather violent weather sometimes encountered by the pilot stresses the craft such that certain measurements change to a degree that consistency between certain locations on the frame or body of the aircraft are inconsistent. Accordingly, the invention also incorporates adjustment devices to compensate for these changes. The entire invention is lightweight, very strong, and is simple to manufacture for a variety of situations.

Accordingly, the main object of this invention is a universal mount for fixing an object exterior of another object, such as a vehicle. Other objects of the invention include a universal mount that is very light-weight, a mount that fixes the object to the vehicle in a solid and vibration-free manner, a mount that is infinitely adjustable, due to the non-planar aspect of the straight sections of the tubes, to allow objects to be positioned in a wide variety of arrangements, a mount that uses relatively inexpensive materials and is arranged in a unique manner to take advantage of the universal strength of tubular construction, a mount that fixes the object to the vehicle in a variety of positions and against a variety of complex maneuvers that, under ordinary circumstances, would cause crippling of the support because of gravitational and torsional forces, and a mount that is simple to affix to a vehicle so that one may use lower skill labor and save on the attendant labor costs.

These and other objects of the invention will become more apparent upon reading the following description of the preferred embodiment taken together with the drawings appended hereto. The scope of protection sought by the inventor may be gleaned from a fair reading of the Claims that conclude this Specification.

DESCRIPTION OF THE DRAWINGS

FIG. 7 is a side elevational view of the first member making up the transition fitting of this invention;

FIG. 8 is an end elevational view of the member shown in FIG. 7;

FIG. 9 is a side elevational view of the second member making up the transition fitting of this invention, with a portion of the support tube in operable position shown in phantom outline;

FIG. 10 is an end elevational view of the member shown in FIG. 9;

FIG. 11 is a side sectional view of a rivet used to pivotally connect the first and second members of the transition fitting together;

FIG. 12a, 12b, 12c, and 12d are trimetric views of various means to stiffen the support tubes at their junction with the object-mounting bracket;

DESCRIPTION OF THE PREFERRED EMBODIMENT

Figure 1:
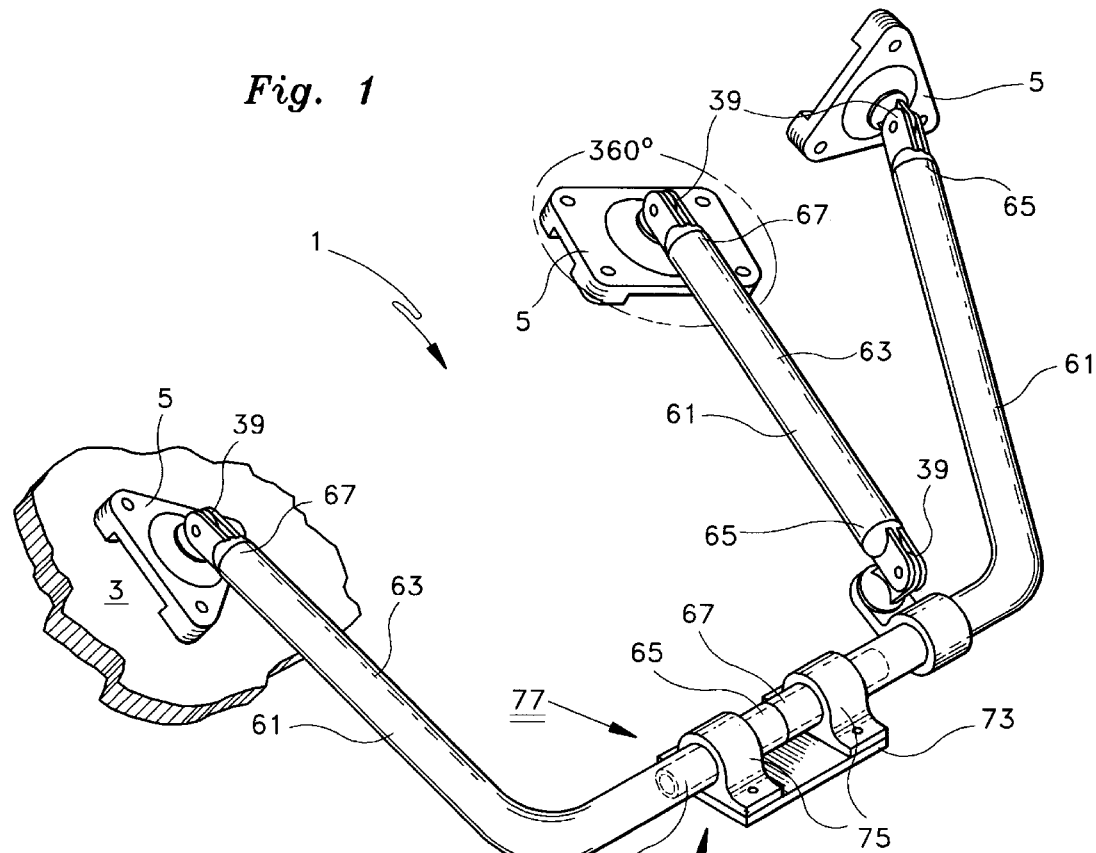
FIG. 1 is a trimetric view of the preferred embodiment of the invention, showing all the components in their relative positions in use on the outside of a helicopter.

Turning now to the drawings, where like elements are identified by like numbers throughout the twenty drawings, FIG. 1 shows the preferred embodiment of the invention 1 mounted against the outer surface of a helicopter fuselage 3 for fixing an object (not shown) outside thereof such as a search light, camera, forward looking infrared scanner, and the like. While described for mounting to a helicopter, this invention finds far broader usage. Accordingly, the invention should not be restricted only to helicopters but finds use in mounting objects to airplanes, boats, ships, trucks and other such vehicles.

Figure 6:
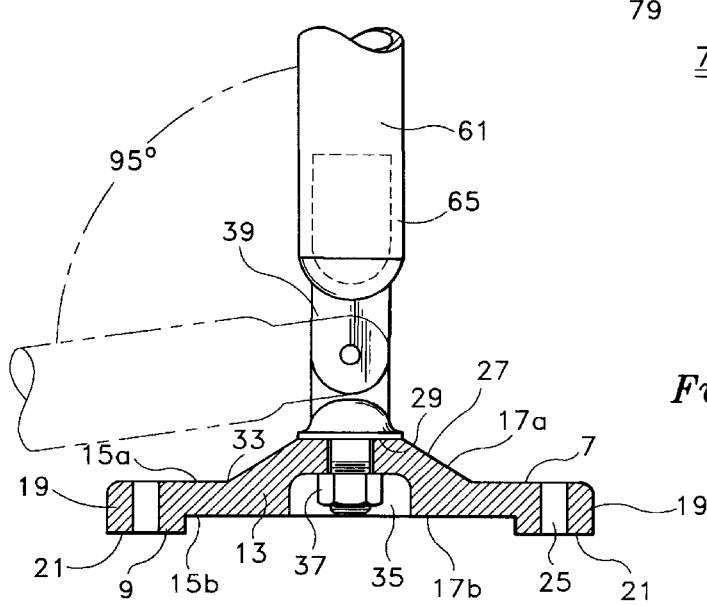
FIG. 6 is a side elevational view, partly in section, of one of the pad mounts that attach the invention to the outer surface of a helicopter, taken along line 6—6 in FIG. 4.
Figure 2:
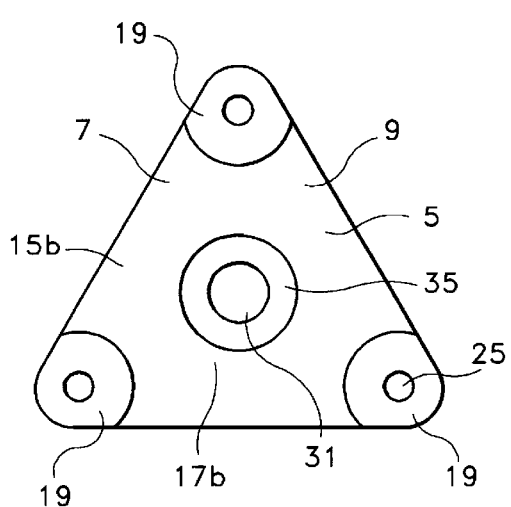
FIG. 2 is a bottom plan view, of one of the pad mounts that attach the invention to the outer surface of a helicopter.
Figure 4:
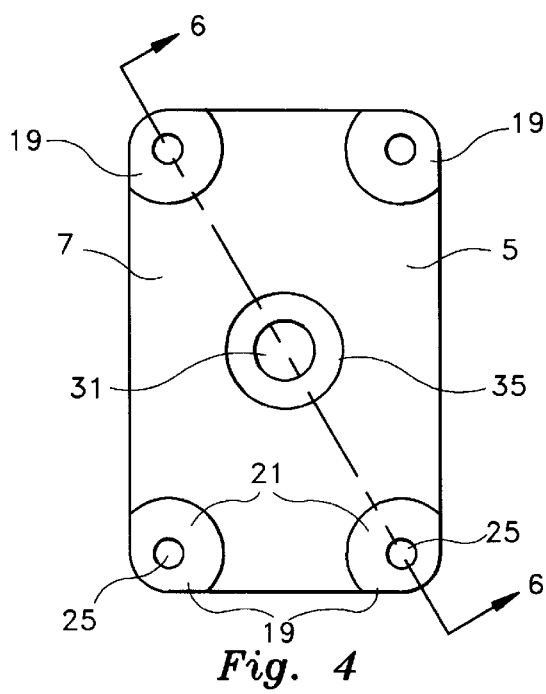
FIG. 4 is a bottom plan view of another of the pad mounts that attach the invention to the outer surface of the helicopter.

The invention generally comprises at least three pad mounts 5 in spaced-apart arrangement for attachment to various portions of the outside of fuselage 3. As shown in FIGS. 2–5 and 6, pad mounts 5 comprise a generally thin, planar slab 7, of relatively small size, usually made of lightweight metal such as aluminum, that is geometric in shape, such as triangular or rectangular or the like and that is roughly divided into an outer section 9 and a contiguous inner section 13, each section being joined to the other and having its own top and bottom surfaces 15a and 15b for outer section 9, and 17a and 17b for inner section 13, respectively. As shown in FIGS. 2, 4 and 6, bottom surface 15b of outer section 9 contains at least three pads 19 that extend downward from bottom surface 15b and terminate in separate pad surfaces 21 for contact, directly or through an intermediate cushion pad (not shown) onto the outer skin of helicopter fuselage 3.

Figure 3:
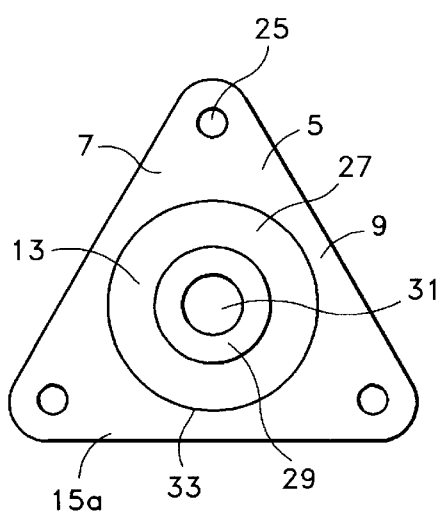
FIG. 3 is a top plan view, of the pad mount shown in FIG. 2.
Figure 5:
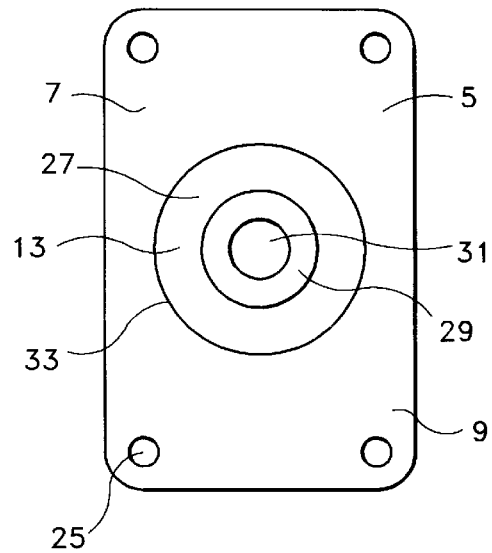
FIG. 5 is a top plan view of the pad mount shown in FIG. 4.

Each pad 19 has formed therethrough an aperture 25 for receipt therein or therethrough of a mounting bolt (not shown) extending outward from fuselage 3. FIGS. 3, 5 and 6 show the top surface 17a of inner section 13 to include an inclined or upwardly sloping surface 27 from outer section top surface 15a to a new and higher inner section top surface 17a terminating at a boss 29 surrounding a center bore 31 formed in inner section 13 and terminated by a shoulder 33. As shown in FIGS. 2, 4 and 6, inner and outer section bottom surfaces 15b and 17b are preferably set higher than pad surfaces 21 to insure that only said pad surfaces 21 contact surface 3 of the helicopter fuselage. In addition, inner section bottom surface 17b has a concave section 35 formed therein, centered about center bore 31, for receipt therein of a lock nut 37 as will be later described. As seen in FIGS. 2–5, pad mounts 5 can be formed in a wide variety of configurations; FIGS. 2 and 3 show triangular mounts while FIGS. 4 and 5 show rectangular mounts. Circular and square mounts, as well as strip mounts, are also contemplated in this invention.

As shown in FIG. 6 a transition fitting 39 is provided for interconnecting pad mounts 5 with the rest of the mount. As shown in FIGS. 6–11, transition fitting 39 comprises a first member 41, known as an "I-bolt" that includes a threaded shaft 43 extending outward for insertion in pad mount center bore 31 and to be fastened therein by a lock nut 37 that is fitted in pad mount concave section 35. First member 41 also includes a shoulder 45 at the top of threaded shaft 43 to ride on boss 29 as shown in FIG. 6 and provide pivotal movement thereabout when said lock nut 37 is loosened. In addition, member 41 includes a tab or tongue 47 extending outward in the opposite direction from threaded shaft 43 and has a cross-aperture 50 formed therethrough, for joining to a second member 49 as shown in FIGS. 9 and 10.

Second member 49 is shown in FIGS. 9 and 10 to comprise an outwardly extending pipe stub 51, reduced in outside diameter by grinding, milling, etc. to the inside diameter of the support tubes to be described later. Member 49 also includes a forked tab or tongue 53 extending outward in the opposite direction from pipe stub 51 for pivotally joining to tongue 47 of first member 41. A cross-aperture 55 is formed in forked tongue 53 for alignment with cross-aperture 50 in tongue 47 for receipt therein of a rivet 57 as shown in FIG. 11 or other such fastener. Rivet 57 allows inter movement between first member 41 and second member 49. Movement 360° in azimuth is allowed by first member 41 about the major axis x—x of threaded shaft 43, as shown in FIGS. 1 and 7. Because first element shoulder 45 rides on boss 29 above top surface 15a, the intermovement between first member 41 and second member 49 is 95° in zenith as well, as shown in FIG. 6.

At least three thin-walled support tubes 61 of terminal length, each said tube containing a straight portion 63 intermediate the terminal ends 65 and 67 thereof, are shown in FIG. 1. Tubes 61 extend outward from transition fittings 39 toward the object to be mounted. Typical of these tubes is aircraft grade 6061 T6 seamless tubing. Important in this invention is the fact that no pair of the straight portions 63 of tubes 61 lie in a plane. This allows tubes 61 to be twisted about transition fittings 39 into a wide variety of positions such that the object may be mounted in a variety of positions vis-a-vis fuselage 3.

When joining tubes 61 to pipe stubs 51, the contacting surfaces between the tubes are preferably each pre-coated with aircraft cement and the assembled walls drilled at locations 69 (see FIG. 9) for receipt therethrough of fasteners such as one-way aircraft rivets known as "cherry" rivets (not shown). For various applications, support tubes 61 may have to undergo some additional bending; however, this requirement is not to be taken as a limitation of the invention. Many inventive devices that are used on aircraft and other vehicles require some additional bending before they are amenable to a specific use.

A bracket means 71 is as shown in FIG. 1 provided for mounting to the object and for interconnection with support tubes 61. The exact place of attachment to tubes 61 depends upon the exigencies of the circumstances. Bracket 71 is shown in FIG. 1 to be a generally flat plate 73 having at least two ring connectors 75 attached thereto for passing around support tubes 61 and be tightened thereagainst. One or more dove-tails may be formed in plate 71 (not shown) for use in mounting the object as is known in the prior art.

The invention contemplates the interconnection of bracket 71 at or near the terminal ends of at least two support tubes 61 as shown in FIG. 1. In doing so, it is important for support tubes 61 to be in axial alignment at the point of attachment to bracket 71 so that ring connectors 75 obtain the maximum support strength from tubes 61. In doing so, means 77 is used to provide light-weight stiffening to said support tubes in the area of attachment to ring connectors 75. As shown in FIGS. 12a, 12b, 12c, and 12d, means 77 comprises a straight member 79 of terminal length inserted inside the abutting ends of support tubes 61 in the area where bracket 71 is attached thereto by ring connectors 75. The important aspects of means 77 is that it be strong, light weight and able to contact the inner walls of tubing 61 when pressed inside thereof. The simplest means is a short piece of the same type tubing (FIG. 12a) only smaller in diameter so that its outside diameter matches with the inside diameter of support tubes 61. Other types of means 77 include a length of sheet metal folded in the shape of a tube (FIG. 12b), an octagonal tube having outside edges that will fit tightly inside support tube 61 (FIG. 12c) and a square piece of elongated material that is sized to fit tightly inside support tube 61 (FIG. 12d).

Figure 13:
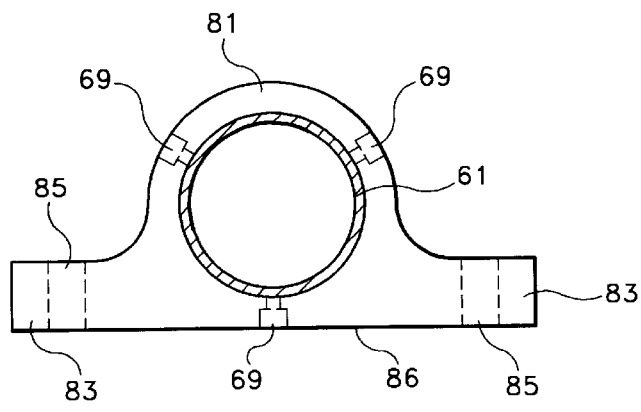
FIG. 13 is a side plan view of the preferred embodiment of the ring connector used in this invention.

As shown in FIG. 13, ring connector 75 is shown to comprise a monolithic piece or element of aluminum or other light-weight, strong metal or plastic that has a tube-encircling portion 81 on each side of which extend attachment ears 83 that each have formed therethrough a bore 85 for receipt therein of fastening means, such as bolts (not shown), that pass into threaded apertures (not shown) in bracket plate 73. A flat bottom 86, formed on connector 75, allows it to seat flush against plate 73. Rivet holes 69 are formed about tube-encircling portion 81 for receipt therein of cherry rivets and the like to pass into support tubes 61 and lock ring connector 75 into tight connection with tube 61. Note that the monolithic nature of ring connector 75 permits it to be slipped over one of the terminal ends of support tube 61.

Figure 14:
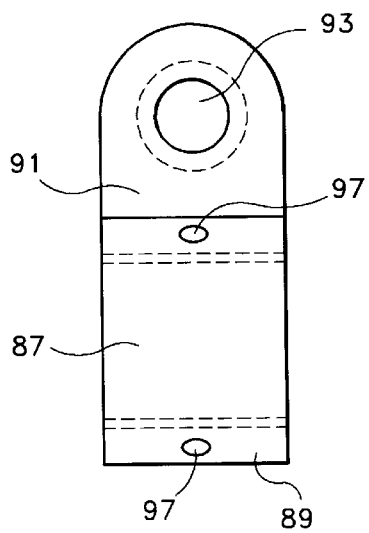
FIG. 14 is a front view, of the preferred embodiment of the ring mount used in this invention.
Figure 15:
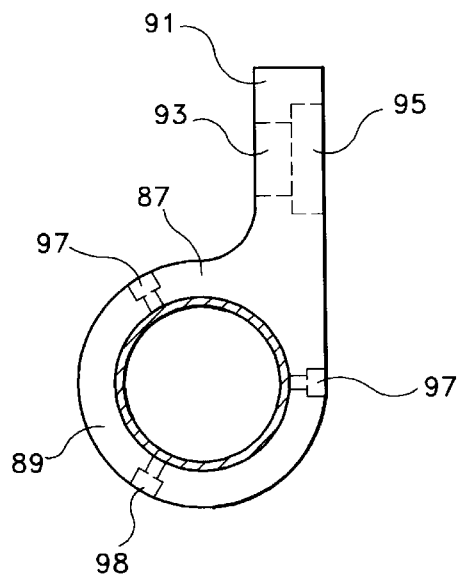
FIG. 15 is a side plan view, partially in section, of the embodiment of the ring mount shown in FIG. 14.

As shown in FIGS. 14 and 15, this invention further includes a ring mount 87 for attaching one support tube 61 to another support tube 61, as shown in FIG. 1. Ring mount 87 is shown to comprise a monolithic piece or element of aluminum or other light-weight, strong metal or plastic that has a tube-encircling portion 89 on one side of which extends a single attachment ear 91 that has formed therethrough a bore 93 for receipt therein of threaded shaft 43 of first member 41 and is locked therein by lock nut 37 that is threaded thereon from the opposite side thereof and is housed in a concave area 95 formed in ear 91 as shown in FIG. 15. Rivet holes 97 are formed about tube-encircling portion 89 for receipt therein of cherry rivets and the like to pass into support tubes 61 and lock ring mount 87 into tight connection with tube 61. Note that the monolithic nature of ring mount 87 permits it to be slipped over one of the terminal ends of support tube 61.

Figure 16:
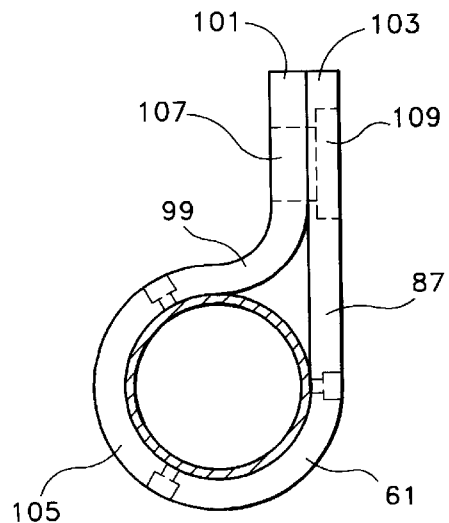
FIG. 16 is a side plan view, partially in section, of another embodiment of the ring connector of this invention; and, FIG. 17 is an exploded view of an adjustment device useful in this invention to compensate for small changes in dimension between similar places on different aircraft.

FIG. 16 shows an alternate embodiment of ring mount 87, that does not display the strength of ring mount 87 shown in FIGS. 14 and 15. This particular ring mount 87 is shown to comprise a strap 99, defined by first and second terminal ends 101 and 103, respectively, and having a central section 105 curved to fit about the outer surface of support tube 61. Strap 99 is made long enough to allow full curvature about tube 61 and have first and second terminal ends 101 and 103 meet in juxtaposed engagement spaced-apart from central section 105 as shown in FIG. 16.

First and second terminal ends 101 and 103 of strap 99 have an aperture 107 formed therethrough, for aligned arrangement when ends 101 and 103 are placed in juxtaposed engagement as shown. Aperture 107 is formed of a size and shape to receive therethrough outwardly extending threaded shaft 43 of first member 41 of transition fitting 39. Lock nut 37 is then threaded onto shaft 43 and located in a concave area 109, formed in strap 99 about aperture 107 as shown, to tighten ring mount 87 about support tube 61.

Figure 17:
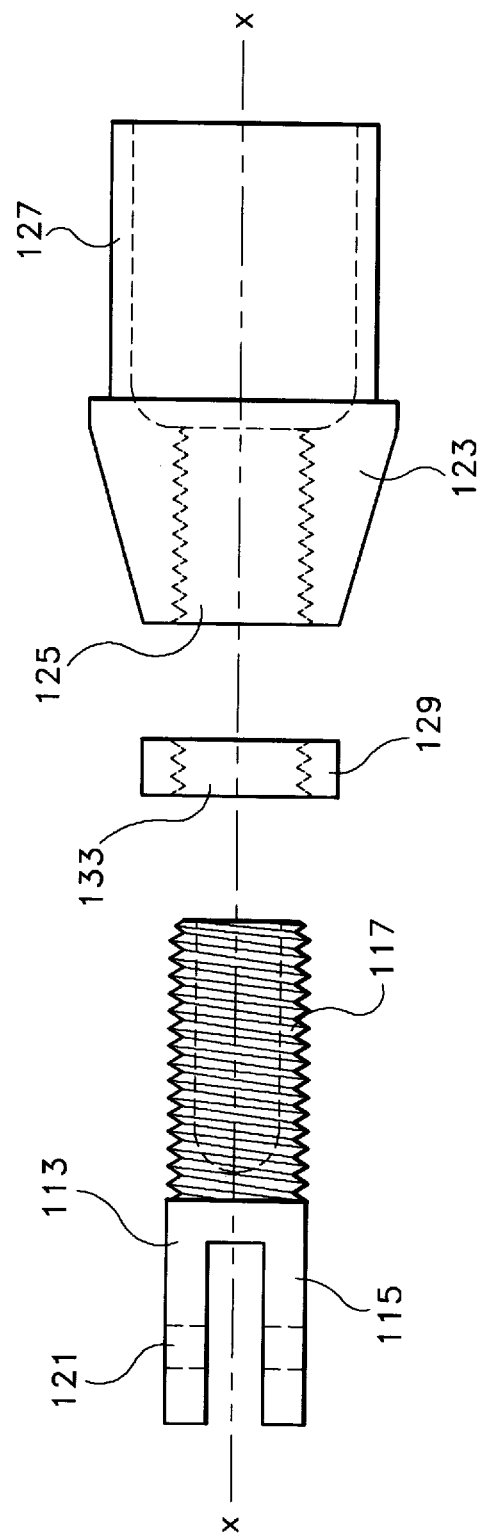

FIG. 17 shows a modified embodiment of transition fitting 39. Shown is a three-piece fitting comprising a first element 113 that includes a forked tongue 115 and a pipe stub 117 attached together either as a single monolithic piece or made separately and welded or otherwise joined in axial attachment. A common aperture 121 is provided cross-wise in forked tongue 115. Pipe stub 117 is hollowed out to save weight without sacrificing strength.

A second element 123 is provided having an internally threaded bore 125 formed in one end thereof and a pipe stub 127 extending from the internal end of bore 125 to the other end of the member. A lock ring 133 is provided having an internally threaded aperture 129 sized to fit in threadingly receipt over pipe stub 117 after stub 117 is threaded down into bore 125. The benefit of this configuration is that forked tongue 115 may be set at virtually any angle about central axis and locked into position using lock ring 129. This is called "clocking" and, along with the ability to move forked tongue 115 inward and outward of second member 123, allows for a substantial amount of adjustment when attaching the mount of this invention to a vehicle of the type described having small but important dimensional differences between vehicles.

In addition to what has been described herein, it is contemplated in this invention to fill the internal spaces in support tubes with structural foam, such as polyurethane foam, in order to increase the strength of the mounting without adding a significant amount of weight to the invention.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A universal utility mount for attaching an object exterior of a vehicle, comprising:
    a) at least three pad mounts in spaced-apart arrangement for attachment to the exterior surface of the vehicle;
    b) a transition fitting attached to each said pad mount, each said fitting allowing adjustment through 360° in azimuth and through 95° from zenith;
    c) at least three thin-walled support tubes of terminal length, each said tube containing a straight portion intermediate the terminal ends thereof, said tubes extending outward from said transition fittings;
    d) a bracket attached to said support tubes on which to mount the object; and,
    e) means for providing light-weight stiffening to said support tubes in the area of attachment with said object-mounting bracket.

2. The universal utility mount of claim 1 wherein no two of said straight portions of said tubes lie in a single plane.

3. The universal utility mount of claim 1 wherein each said pad mount comprises:
   a) an outer section and contiguous inner section, each said section defined by respective top and bottom surfaces;
   b) said outer section including at least three pads in spaced-apart arrangement extending downward from said bottom surface of said pad mount for contact with the surface of the vehicle, each said pad having formed therethrough an aperture for receipt therein of a mounting bolt extending outward from the vehicle; and,
   c) wherein said pad mount includes a surface sloping upward from said outer section top surface to said inner section top surface, said inner section having formed therethrough a center bore for receipt therein of a portion of said transition fitting; and, wherein said inner section bottom surface includes a concave portion.

4. The universal utility mount of claim 1 wherein said pad mount is of a triangular outer shape.

5. The universal utility mount of claim 1 wherein said pad mount is of a rectangular outer shape.

6. The universal utility mount of claim 1 wherein said pad mount is of a circular outer shape.

7. The universal utility mount of claim 1 wherein said pad mount is of a square outer shape.

8. The universal utility mount of claim 1 wherein said pad mount is of a strip outer shape.

9. The universal utility mount of claim 1 wherein said transition fitting comprises:
   a) a first member having an outwardly extending threaded shaft for connection to one of said pad mounts;
   b) a second member having an outwardly extending tube stub for insertion into one end of one of said support tubes; and,
   c) means for pivotally connecting said first member and said second member together.

10. universal utility mount of claim 3 wherein said transition fitting further comprises:
    a) said first member having an outwardly extending threaded shaft headed by a shoulder for abutment against said inner section top surface of said pad mount when said threaded shaft is inserted in said center bore; and,
    b) a lock nut for threaded receipt on said threaded shaft inside said concave portion of said pad mount.

11. The universal utility mount of claim 10 wherein said pad mount further includes a boss formed on said inner section top surface, about said center bore, for pivotal receipt thereon of said shoulder of said first member for rotation thereabout.

12. The universal utility mount of claim 1 wherein said bracket includes:
    a) a plate for attachment to the object to be mounted; and,
    b) at least two ring mountings, in spaced-apart arrangement, for interconnection between said plate and said support tubes;
    c) wherein said ring mountings each including a base portion for attachment to said plate and a ring portion for attachment to said base portion, and means for attaching said base portion and said ring portion together.

13. The universal utility mount of claim 12 wherein said ring portion is arranged to frictionally fit over said support tube.

14. The universal utility mount of claim 12 wherein said base portion and said ring portion are formed from a monolithic element.

15. The universal utility mount of claim 1 further including a ring connector for connecting said support tubes to said bracket, wherein said ring connector comprises:
    a) a monolithic element having a tube-encircling portion; and,
    b) attachment ears that extend from each side of said tube-encircling portion, each said ear having formed therethrough a bore for receipt therein of fastening means for passing into threaded apertures formed in said bracket;
    c) said tube-encircling portion having holes formed therethrough for receipt therein of fasteners to pass into said support tubes to lock said ring connector into tight connection with said support tube.

16. The universal utility mounting of claim 1 further including a ring mount for attaching one of said support tubes to another of said support tubes, said ring mount comprising:
    a) a monolithic element including a tube-encircling portion; and,
    b) an attachment ear extending from one side of said tube-encircling portion having formed therethrough a bore for receipt therein of a fastener to be locked therein by a lock nut that is threaded thereon from the opposite side thereof and is housed in a concave area formed in said ear;
    c) said tube-encircling portion having holes formed therethrough for receipt therein of fasteners to pass into said support tubes to lock said ring mount into tight connection with said support tube.

17. The universal mounting of claim 1 wherein said means for providing light-weight stiffening to said support tubes comprises a short length of strong, rigid tubing of a size and shape to be tightly received in the ends of said support tubes that are connected to said bracket.

18. The universal mounting of claim 1 wherein said means for providing light-weight stiffening to said support tubes comprises a short length of sheet metal folded in the shape of a tube and of a size and shape to be tightly received in the ends of said support tubes that are connected to said bracket.

19. The universal mounting of claim 1 wherein said means for providing light-weight stiffening to said support tubes comprises a short length of an octagonal tube having outside edges that will be tightly received in the ends of said support tubes that are connected to said bracket.

20. The universal mounting of claim 1 wherein said means for providing light-weight stiffening to said support tubes comprises a short length of a square piece of elongated material that is sized to be tightly received in the ends of said support tubes that are connected to said bracket.

21. The universal utility mounting of claim 9 further including a ring mount for attaching one of said support tubes to another of said support tubes, said ring mount comprising:
    a) a strap defined by first and second terminal ends and having a central section curved to fit about the outer surface of said support tube, said first and second terminal ends meeting in juxtaposed engagement spaced-apart from said central section; and,
    b) said first and second terminal ends of said strap having an aperture formed therethrough, for aligned arrangement when said ends are placed in said juxtaposed engagement; and, c) wherein said aperture is of a size and shape to receive therethrough said outwardly extending threaded shaft of said first member of said transition fitting.

22. The universal utility mount of claim 1 wherein said second member of said transition fitting comprises:
   a) a first element of terminal length having a forked tongue extending outward from one terminal end and a threaded shaft extending axially outward from the other terminal end in the opposite direction for threaded receipt in a second element;
   b) said second element of terminal length having a threaded bore in one terminal end for receipt of said threaded shaft of said first element, and a tube stub extending axially outward from the other terminal end in the opposite direction for receipt in one end of one of said support tubes; and,
   c) a lock nut interposed said first element and said second element for allowing clocking of said first element with respect to said second element and fixing the distance therebetween.

23. The universal utility mounting of claim 1 further including structural foam placed inside said support tubes to provide strength to said mounting without adding a significant amount of weight thereto.

* * * * *